United States Patent [19]
Saito

[11] Patent Number: 4,525,617
[45] Date of Patent: Jun. 25, 1985

[54] METHOD AND APPARATUS FOR AUTOMATIC ELECTRIC SEAM RESISTANCE WELDING OF CAN BODIES

[75] Inventor: Akihiro Saito, Ebina, Japan

[73] Assignee: Fujikogyosho Co., Ltd., Tokyo, Japan

[21] Appl. No.: 657,058

[22] Filed: Oct. 3, 1984

Related U.S. Application Data

[63] Continuation of Ser. No. 333,337, Dec. 22, 1981, abandoned.

[30] Foreign Application Priority Data

Dec. 24, 1980 [JP] Japan ............................. 55-183172

[51] Int. Cl.³ .......................................... B23K 11/06
[52] U.S. Cl. ...................................... 219/83; 219/64
[58] Field of Search ....................... 219/81, 82, 83, 64

[56] References Cited

U.S. PATENT DOCUMENTS

| | | | |
|---|---|---|---|
| 2,578,832 | 12/1951 | Pearson et al. | 219/64 |
| 3,610,862 | 7/1979 | Erlandson | 219/64 X |
| 3,834,010 | 9/1974 | Wolfe et al. | 219/64 X |
| 4,160,892 | 7/1977 | Opprecht et al. | 219/83 |

FOREIGN PATENT DOCUMENTS

| | | | |
|---|---|---|---|
| 637036 | 2/1962 | Canada | 219/64 |
| 553012 | 8/1974 | Switzerland . | |

Primary Examiner—Roy N. Envall, Jr.
Assistant Examiner—C. M. Sigda
Attorney, Agent, or Firm—Kenyon & Kenyon

[57] ABSTRACT

In order to perform automatic seam welding of thin-walled can bodies at a high welding speed of more than 40 m/min, during conveyance of a cylindrical can body blank along a cross-sectionally Z-shaped rail, the blank is held by a holding device comprising contacting concave plates or rolls, each of which rotates about a pin located outside near the can body blank and in a plane perpendicular to the center axis of the can body blank and each of which has a spring and stopper for limiting the rotation so as to diminish and absorb the shaking of the can body blank.

6 Claims, 5 Drawing Figures

METHOD AND APPARATUS FOR AUTOMATIC ELECTRIC SEAM RESISTANCE WELDING OF CAN BODIES

This application is a continuation of application Ser. No. 06/333,337, filed Dec. 22, 1981, now abandoned.

BACKGROUND OF THE INVENTION

1. Field of the Invention

The present invention relates to production of can bodies, and, more particularly, to a method of automatic electric seam resistance welding of a thin-walled can body and an apparatus for carrying out the method.

2. Description of the Prior Art

Generally, a method of automatically producing a can body by using an electric seam resistance welding method comprises the steps of deforming a thin rectangular flat metal blank into a cylindrical can body blank and welding the side ends of the cylindrical blank to form a longitudinal seam. Generally the metal blank has a rectangular shape after being cut from a metal sheet by a slitter, and is deformed into the cylindrical blank by a roll-forming machine. Both side ends of the cylindrical blank are inserted into a pair of corresponding guide grooves of a guide rail. Keeping the side ends inside the guide grooves, the cylindrical blank is conveyed along the guide rail into a roller-electrode station of an electric seam resistance welding apparatus by a suitable conveying means, e.g., a chain circulating in parallel with the center axis of the cylindrical blank and provided with hooks. Then, the side ends overlap each other and are welded between the roller electrodes in a longitudinal direction, whereby a welded can body is obtained.

The guide rail (a so-called Z-shape rail) and the roller electrodes are well-known by persons having ordinary skill in the art and are described in, for example, Japanese Utility Model Publication No. 49-26817 and Japanese Patent Publication No. 54-26213 (corresponding to U.S. Pat. No. 4,160,892). When the seam welding is carried out, portions of the overlapped ends of the cylindrical blank are fused and pressed by the roller electrodes, so that a rotative distortion is generated so as to open the overlapped ends. Taking the rotative distortion into consideration, the depth of the guide grooves of the guide rail, i.e., the overlapping width of the side ends is defined in such manner that the depth of the guide grooves decreases in the forward direction. Furthermore, the axes of rotation of the roller electrodes are rotated from a vertical plane including the longitudinal welding line so as to cross each other at a small angle in a top view.

The flow and relative position of a blank, in the case where the above-mentioned deforming and welding steps are automatically carried out successively to produce can bodies, are described below. In a deformation system including the roll-forming machine, a preceding deformed cylindrical blank is removed from the machine by a hook of the chain. Deformation of the succeeding blank should be completed by the time the next hook appears in the machine. Therefore, it is necessary to make the distance between the hooks approximately twice as long as the length of the blank. Furthermore, since the feeding direction of a flat blank into the roll-forming machine is perpendicular to the conveying direction (i.e., the direction of movement) of the cylindrical blank, the deforming speed of the blank is twice or more as fast as the removal (movement) speed of the blank from the machine. In a welding system including the guide rail and the roller electrodes, the cylindrical blanks should be fed between the roller electrodes keeping a minimum space between the preceding and succeeding blanks to prevent the blanks from coming into contact with each other and to prevent the roller electrodes from coming into contact with each other. Therefore, the movement speed of the cylindrical blank from the deformation system into the welding system is approximately twice as fast as the welding speed of the roller electrodes. Accordingly, the blank is deformed at a speed four times or more as fast as the welding speed, is suddenly stopped, is conveyed at a suddenly accelerated speed approximately twice as fast as the welding speed, is rapidly decelerated in the welding system, and then is fed out of the welding system at the welding speed. Thus, a thin metal blank having a small rigidity is subjected to the above-mentioned sudden actions. As the production rate in a series production of can bodies is increased, the blank is more strongly subjected to inertial forces, shaking (radial displacement of the center axis) of the cylindrical blank, vibration, and frictional resistance, so that it is difficult to feed the blank into the welding station without undesirable influences.

Hitherto, since the production rate (i.e., the welding speed) of can bodies has been relatively low, the undesirable influences of inertia force, shaking (radial displacement of the center axis), vibration, and frictional resistance have been relatively small. Therefore, it has been possible to weld can bodies automatically by pressing the cylindrical blank with elastically-supported guide plates or rollers to bring both side ends of the blank into contact with the bottoms of the two guide grooves of the guide (Z-shape) rail, respectively. The pressure of the side ends on the bottoms has been regulated so that the side ends are not damaged and the forward movement of the cylindrical blank is not impeded. However, if the production speed is increased to a high speed of more than approximately 40 m/min in a conventional apparatus for automatic electric seam resistance welding of can bodies, the above-mentioned undesirable influences are increased and the vibration may become resonant. As a result, the cylindrical blank shakes and the guide plates are shaken by the blank, so that it is impossible to keep the center axis of the cylindrical blank stable. Therefore, on the one hand, the frictional resistance of the guide grooves against the side ends of the blank is frequently increased, so that damage of the side ends may easily occur and/or displacement in the forwarding direction of one of the side ends may easily occur. On the other hand, it is impossible to ensure sufficient pressure for bringing the side ends into contact with the bottoms, so that a uniform overlapping width of the side ends can not be ensured. Accordingly, it is impossible to make a preset overlapping width less than three times as large as the plate thickness of the blank. Namely, it is very difficult to weld the can body with a constant overlapping width, particularly one being less than three times as large as the blank thickness, when the seam welding is carried out at a high speed of more than 40 m/min.

It is therefore an object of the present invention to provide a method of automatic electric seam resistance welding of can bodies at a high speed of more than 40 m/min.

It is another object of the present invention to provide an improved apparatus for carrying out the above method.

SUMMARY OF THE INVENTION

According to the present invention, when a method of automatic electric seam resistance welding of can bodies comprising the steps of inserting both side ends of a cylindrical can body blank into guide grooves of a guide (Z-shape) rail; conveying the blank between a pair of roller electrodes; and welding the overlapped side ends is carried out, the cylindrical can body blank moving along the guide rail is held by a holding device comprising contacting concave plates or rolls, each of which plates or rolls rotates about a stationary pin in a plane perpendicular to the center axis of the can body blank and is provided with an elastic means limiting the rotation. According to the above method of the present invention, shaking and strain of the cylindrical can body blank are absorbed by the rotation of the contacting concave plates or rolls; the center axis of the blank is kept in a predetermined position by establishing a point of the contacting surface of each of the plate or roll, which point is hardly displaced; and both side ends come into light contact with the bottoms of the corresponding guide grooves. Thus, the holding device can absorb shaking of the cylindrical can body blank during conveyance.

The present invention will be further explained by means of the description of the preferred embodiments of the present invention, set forth below with reference to the accompanying drawings.

DETAILED DESCRIPTION OF THE PREFERRED EMBODIMENTS

Figure 1:
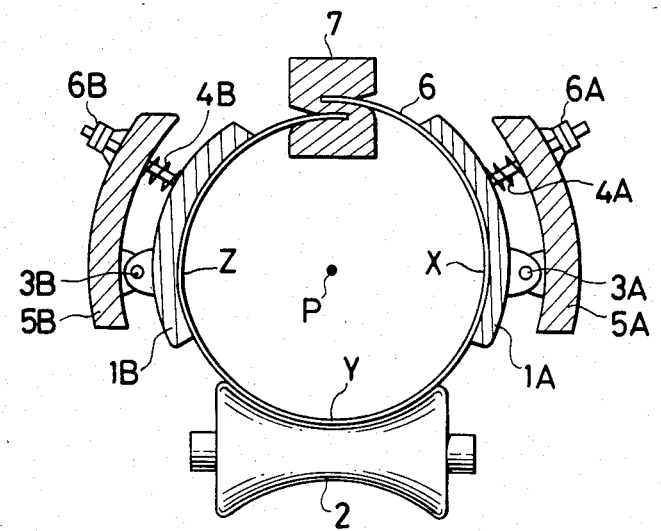
FIG. 1 is a schematic cross sectional end view of a holding device of an embodiment of the present invention.

FIG. 1 shows a holding device of an apparatus for automatically electric seam resistance welding can bodies, according to one embodiment of the present invention, comprising a pair of contacting concave plates 1A and 1B and a concave roll 2. The plate 1A (1B) is provided with a stationary pin 3A (3B) and a spring 4A (4B).

The pin 3A (3B) is attached to a frame 5A (5B) of the apparatus and the spring 4A (4B) is regulated by stopper 6A (6B). The contacting concave surface plate 1A (1B) can rotate about the pin 3A (3B) in a plane perpendicular to the center axis P of a cylindrical can body blank 6. However, the portion of the plate 1A (1B) in which the spring 4A (4B) is arranged can not rotate in the inside direction beyond the predetermined diameter dimension of the can body blank by the stopper 6A (6B) and in the outside direction beyond the spring 4A (4B) and the frame 5A (5B). As illustrated in FIG. 1, the cylindrical can body blank 6 is held by the contacting concave plates 1A and 1B and the roll 2 so as to insert both side ends of the can body blank 6 into the guide groove of a guide (Z-shape) rail 7. Since the radius of the concave surface of the plates 1A (1B) and the roll 2 is larger than that of the cylindrical can body blank 6 by just a little and the point X (Z) of the contacting surface of the plate 1A (1B) being nearest to the pin 3A (3B) and the point Y of the roll surface being the bottom of the concave are arranged on the diameter of the can body blank 6, the side ends come into light contact with the guide groove bottoms and simultaneously the cylindrical can body blank 6 comes into light contact with the points X, Y, and Z, if a perfectly cylindrical blank 6 is held by the plates 1A and 1B and the roll 2.

Figure 2:
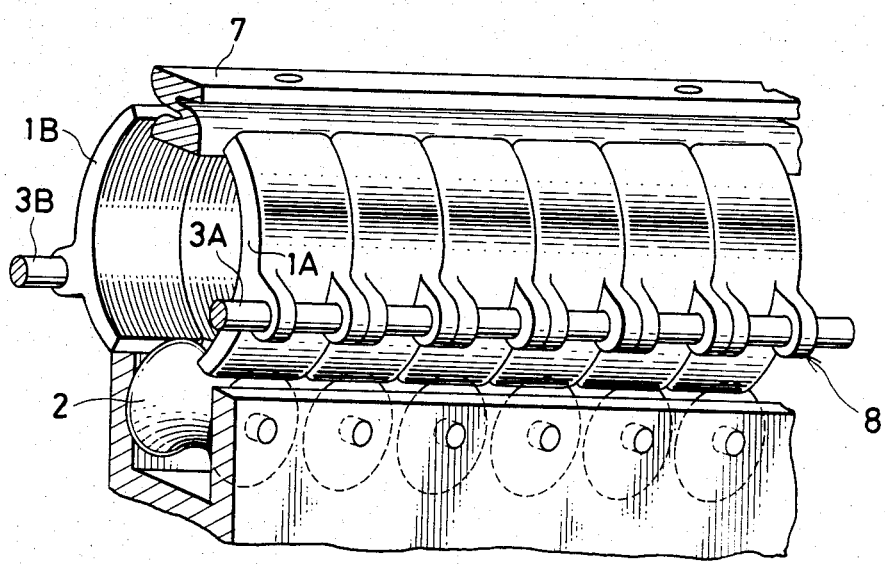
FIG. 2 is a schematic isometric representation of an automatic seam welding apparatus comprising the holding device of FIG. 1.

FIG. 2 shows an apparatus for electric seam resistance welding of can bodies according to the present invention, comprising a holding device 8, the guide rail 7, a conveying means, and a pair of roller electrodes. The holding device is made of segments comprising two contacting concave plates 1A and 1B and the roll 2, mentioned and illustrated in FIG. 1. For the sake of clarity and convenience, the springs, the stoppers, the frames, and the cylindrical can body blank are not illustrated in FIG. 2. The conveying means comprises a chain provided with hooks.

A can body is produced by using the above-mentioned automatic apparatus in the following manner:

A cylindrical can body blank deformed in a conventional roll-forming machine (not shown) is fed into the holding device 8 (FIG. 2) to insert the side ends of the blank 6 into the guide grooves of the guide rail 7 (FIG. 1) by the hook 10B of the chain 10A. Then, the can body blank held by the holding device 8 is conveyed along the guide rail 7. Finally, the overlapped side ends of the can body blank are welded between the roller electrodes, whereby the welded can body is obtained. The deformation speed is four times as fast and the conveying speed is twice as fast as the welding speed, as stated above. Therefore, in a case where the overlapped side ends of the cylindrical can body blank are welded at a high speed, for example, 40 m/min, a flat blank is deformed at 160 m/min, the cylindrical blank is suddenly stopped and subsequently is conveyed at 80 m/min. During the conveyance, the cylindrical can body blank is strongly shaken and vibrates. Naturally, the center axis P of the cylindrical blank is rapidly and continuously displaced in the radial direction. Such blank is fed into the holding device.

When the cylindrical blank shakes in the holding device, the blank 6 applies forces against the plates 1A and 1B and the roll 2. However, since the point Y of the roll 2 is stationary and the points X and Z of the plates 1 and 2 hardly move, the shaking force creates strain on the low-rigidity cylindrical blank to rotate the plates 1A and 1B so as to compress the springs 4A and 4B. While the upper portion of the plate 1A (1B) is pushed in the outside direction, the lower portion of the plate 1A (1B) pushes the cylindrical blank in the inside direction, so that the side ends of the blank 6 can not come off the guide grooves. Thus, the rotation action of the contacting concave plates 1A and 1B and the elastic action of the spring 4A and 4B can diminish and absorb the shaking and inertia force of the cylindrical can body blank 6. Since the holding device is made of divided segments, each of which segments comprises a pair of the contacting concave plates 1A and 1B, as illustrated in FIG. 2, the shaking and inertial force of the cylindrical blank are rapidly diminished by the respective rotations of the plates. In other words, the energy of the shaking and inertia of the cylindrical blank is converted into deformation energy by utilizing the low rigidity of the thin blank. The points X (Z) of the concave surfaces of a large number of the plates 1A (1B) lie substantially on a straight line parallel to the forwarding direction of the cylindrical can body blank. The points Y of the concave surfaces of a large number of the rolls 2 lie on another straight line also parallel to the forwarding direction. Furthermore, since the guide rail is stationary and the above three straight lines are parallel to each other, the center axis P of the cylindrical blank is stably held in a predetermined position. Therefore, it is possible to prevent the side ends of the blank from coming into strong contact with the bottoms of the guide grooves. The side ends can come into slight contact with the bottoms to ensure the prescribed overlapping width of the side ends. According to the present invention, it is possible to produce a can body having the same quality as that of a can body produced at a relatively low production speed in accordance with a conventional method, at a high production speed of more than 40 m/min.

Figure 3:
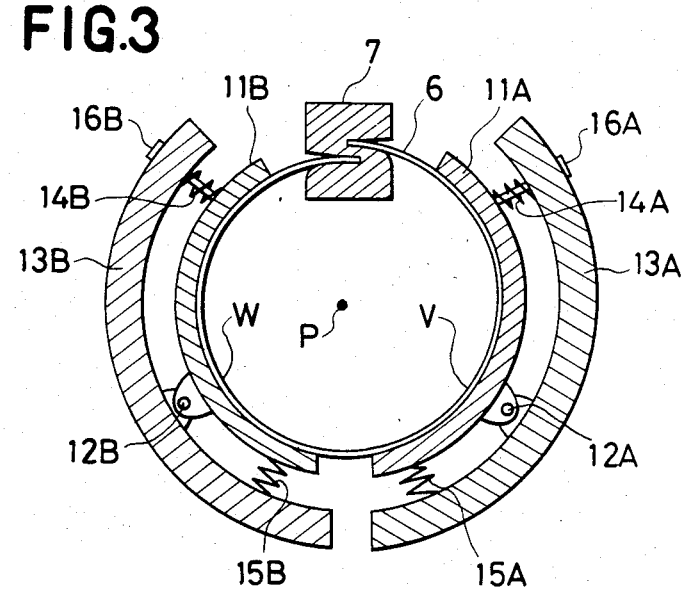
FIGS. 3 and 4 are schematic cross sectional end views of a holding device of another embodiment of the present invention.

FIG. 3 shows a holding device of an apparatus for electric seam resistance welding of can bodies according to another embodiment of the present invention, comprising a pair of contacting concave plates 11A and 11B. The plate 11A (11B) is provided with a stationary pin 12A (12B) attached in a frame 13A (13B), springs 14A and 15A (14B and 15B), and a stopper 16A (16B). The plate 11A (11B) can rotate about the pin 12A (12B) in a plane perpendicular to the center axis P of the cylindrical can body blank 6. The rotation of the plate 11A (11B) is limited by the stopper 16A (16B) and the combination of the spring 14A (14B) with the frame 13A (13B). In this case, there are two almost stationary points V and W of the concave surface of the plates 11A and 11B. The cylindrical can body blank 6 can be held by the two concave plates 11A and 11B, bringing the side ends of the blank into light contact with the bottom of the guide grooves of the guide rail 7.

Figure 4:
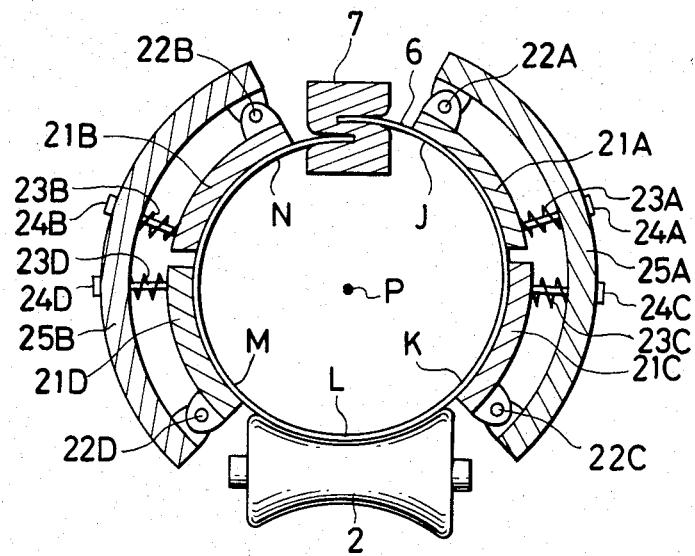

FIG. 4 shows a holding device of an apparatus for electric seam resistance welding of can bodies according to another embodiment, comprising two pairs of contacting concave plates 21A, 21B, 21C, and 21D and a concave roll 2. The plate 21A (21B, 21C, or 21D) is provided with a stationary pin 22A (22B, 22C, or 22D), a spring 23A (23B, 23C, or 23D), and a stopper 24A (24B, 24C, or 24D). The pins 22A and 22C are attached to a frame 25A, and the pins 22B and 22D are attached to a frame 25B. The plate 21A (21B, 21C, or 21D) can rotate about the pin 22A (22B, 22C, or 22D) in a plane perpendicular to the center axis P of the cylindrical can body blank 6. The rotation of the plate 21A (21B, 21C, or 21D) is limited by the stopper 24A (24B, 24C, or 24D) and the combination of the spring 23A (23B, 23C or 23D) with the frame 25A (25B). In this case, there are four almost stationary points J, K, M, and N of the concave surfaces of the plates 21A, 21B, 21C, and 21D as well as a stationary point L of the roll concave surface. The cylindrical can body blank 6 can be held by the four concave plates (21A, 21B, 21C, and 21D), bringing the side ends of the blank 6 into light contact with the bottom of the grooves of the guide rail 7.

Figure 5:
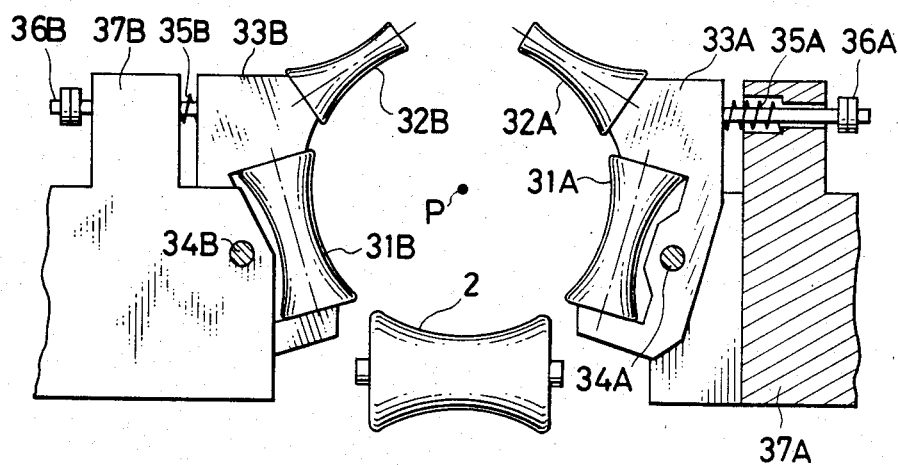
FIG. 5 is a schematic end view of a holding device comprising contacting rolls of still another embodiment of the present invention.

FIG. 5 shows a holding device of an apparatus for electric seam resistance welding of can bodies according to still another embodiment, comprising rotatable concave rolls 31A, 31B, 32A and 32B, instead of the contacting concave plates, and a stationary roll 2. The rolls 31A and 32A (31B and 32B) are supported by a supporting block 33A (33B) which is provided with a stationary pin 34A (34B), a spring 35A (35B), and a stopper 36A (36B). The pin 34A (34B) is attached to a frame 37A (37B). The concave rolls 31A and 32A (31B and 32B) can rotate about the pin 34A (34B) in a plane perpendicular to the center axis P of a cylindrical can body blank (not shown). The rotation of the rolls 31A and 32A (31B and 32B) is limited by the stopper 36A (36B) and the combination of the frame 37A (37B) with the spring 35A (35B) or the supporting block 33A (33B). Each of the rolls 31A, 31B, 32A, and 32B rotates about its axis, so that it is possible to prevent surface defects on the can body and to decrease the frictional resistance.

In the above-mentioned holding devices illustrated in FIGS. 3, 4, and 5, the shaking of the cylindrical can body blank moving at a high speed can be absorbed in similar manner to the case of the holding device illustrated in FIGS. 1 and 2.

It will be obvious that the present invention is not restricted to the above-mentioned embodiments, and that many variations are possible for persons skilled in the art, without departing from the scope of the present invention, such as in materials, plate thickness, shape, and dimensions of the welded can body.

I claim:

1. A method of automatic electric seam resistance welding of a thin-walled cylindrical can body, the method having the steps of inserting both side ends of a cylindrical can body blank into guide grooves of a guide rail having a Z-shaped cross section for overlapping said side ends; conveying the cylindrical can body blank into an electrode station for seam welding; and welding the overlapped side ends at a high welding speed; the improvement comprising that the step of welding the overlapped side ends is performed at a rate which is at least 40 m/min, and that during the step of conveying the cylindrical can body blank into the electrode station, there is provided the further step of holding the cylindrical can body blank by a holding device comprising segments, each of which has at least one pair of contacting concave members, each of said contacting concave members being pivotable about a stationary pivot pin positioned parallel to, and at a predetermined distance from, a center axis of the cylindrical can body blank, a line between said center axis and said pivot pin intersecting the concave profile of said concave member such that a first portion of the concave member contacts the cylindrical can body blank on one side of said line and a second portion of the concave member contacts the cylindrical can body portion on the other side of said line, and each contacting concave member being provided with an elastic means for limiting pivotal movement of said contacting concave member, whereby movement of said first portion of the concave member toward said center axis results in movement of said second portion of the concave member away from said center axis and vice versa so that shaking of said cylindrical can body blank is diminished and absorbed by said pivotal movement to keep said center axis of said cylindrical can body blank stably at a predetermined position and so that both the side ends come into light contact with the corresponding bottoms of the guide grooves.

2. A method according to claim 1, wherein said diminution and absorption of said shaking of said cylindrical can body blank are locally regulated by each of said segments.

3. An apparatus for automatic electric seam resistance welding of a thin-walled can body, the apparatus being of the type having a guide rail having a Z-shaped cross section forming two guide grooves for accommodating both side ends of a cylindrical can body blank; a conveying means for conveying the can body blank into an electrode station for seam welding; and a holding device for holding the can body blank along said guide rail; the improvement comprising that the holding device comprises segments, of which each has at least one pair of contacting concave member, each of said contacting concave members having a stationary pivot pin arranged at a pivot axis which is parallel to, and is located at a predetermined distance from, a center axis of the can body blank such that a line between said center axis and said pivot pin intersects the concave profile of said concave member, a first portion of the concave member being adapted to contact a cylindrical can blank on one side of said line and a second portion of the concave member being adapted to contact the cylindrical can blank on the other side of said line, and each of said contacting concave members being further provided with an associated elastic means for limiting the pivotal movement of an associated one of said contacting concave members.

4. An apparatus according to claim 3, wherein said contacting concave member comprises a roll which is supported by a block provided with said stationary pivot pin and said elastic means.

5. An apparatus according to claim 3, wherein said elastic means comprises a spring and a stopper.

6. An apparatus according to claim 3, wherein each of said holding segments further comprises at least one stationary roll arranged opposite to said guide rail.

* * * * *

UNITED STATES PATENT AND TRADEMARK OFFICE
CERTIFICATE OF CORRECTION

PATENT NO. : 4,525,617
DATED : June 25, 1985
INVENTOR(S) : Akihiro Saito

It is certified that error appears in the above-identified patent and that said Letters Patent is hereby corrected as shown below:

Column 3, line 26, change "spohding" to --sponding--.

Column 4, line 9, after "concave" insert the word --surface--.

Column 7, line 13, change "member" to --members--.

Signed and Sealed this

Twenty-fourth Day of December 1985

[SEAL]

Attest:

DONALD J. QUIGG

*Attesting Officer*   *Commissioner of Patents and Trademarks*